W. T. WILSON.
FURNACE.
APPLICATION FILED OCT. 16, 1916.

1,262,893.

Patented Apr. 16, 1918.
2 SHEETS—SHEET 1.

William T. Wilson
INVENTOR.

BY
ATTORNEYS.

W. T. WILSON.
FURNACE.
APPLICATION FILED OCT. 16, 1916.

1,262,893.

Patented Apr. 16, 1918.
2 SHEETS—SHEET 2.

William T. Wilson
INVENTOR.

BY *Milo H. Stevens Leo.*

ATTORNEYS.

UNITED STATES PATENT OFFICE.

WILLIAM T. WILSON, OF CHICAGO, ILLINOIS.

FURNACE.

1,262,893.  Specification of Letters Patent.  Patented Apr. 16, 1918.

Application filed October 16, 1916. Serial No. 125,872.

*To all whom it may concern:*

Be it known that I, WILLIAM T. WILSON, a citizen of the United States, residing at Chicago, in the county of Cook and State of Illinois, have invented new and useful Improvements in Furnaces, of which the following is a specification.

This invention relates to furnaces for heating soldering irons and other tools, and its object is to provide a novel and improved means for controlling a rotary valve which regulates the burner, the control being effected automatically by the tool to be heated by means of a lever having within itself the means for limiting the extent of its strokes.

The invention also has for its object to provide a structure which is simple by supporting a fuel supply pipe on the legs of a stand, and also to provide a means for the free and certain movements of the valve controlling lever by fastening the same to a rod extending between the legs.

In order that the invention may be better understood, reference is had to the accompanying drawings, in which, Figure 1 is a side elevation of the device;

Figure 1:
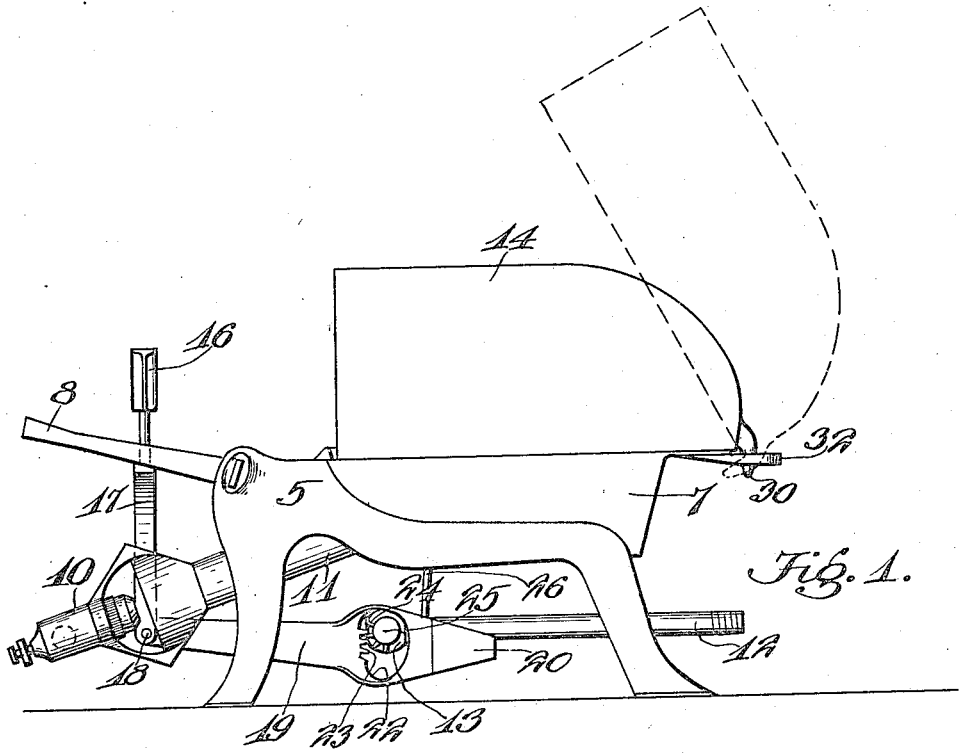
Figure 2:
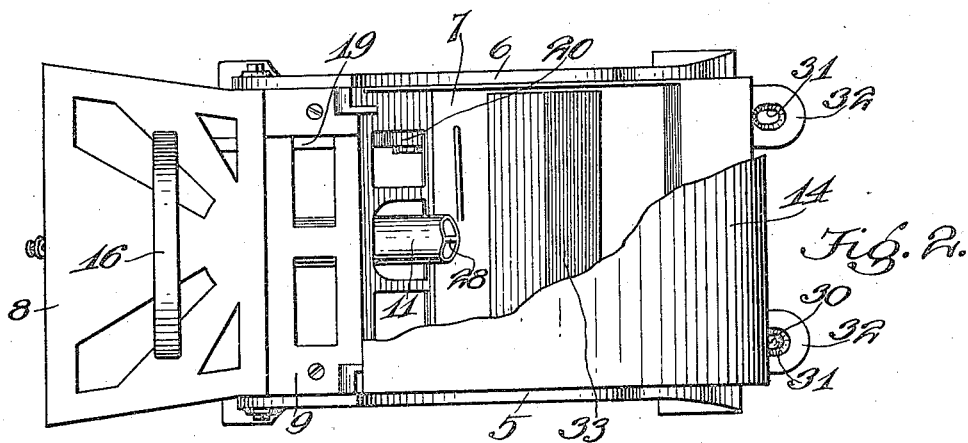
Fig. 2 is a plan view thereof, partly broken away.

Referring specifically to the drawings, 5 and 6 denote the two sides of a stand which supports the combustion chamber 7 of a soldering furnace. The stand has trays 8 and 9 on which handles or other projections from work being heated can rest. The furnace is heated by a Bunsen burner 10 having the usual nozzle 11. The gas supply pipe is shown at 12, the same being provided with a rotary control valve 13. Above the chamber 7 is a heat-concentrating hood 14 lined with a fire-resisting material 15.

Figure 3:
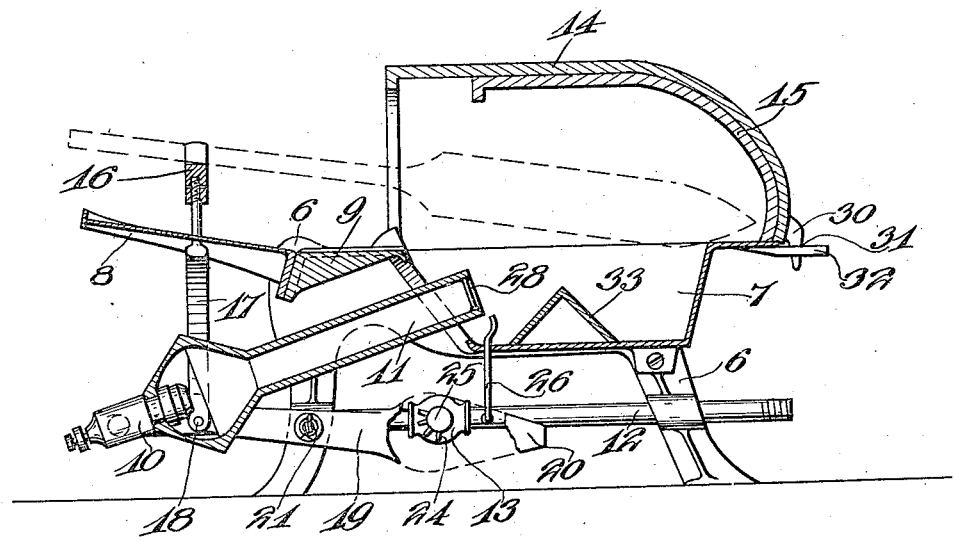
Fig. 3 is a longitudinal section.
Figure 4:
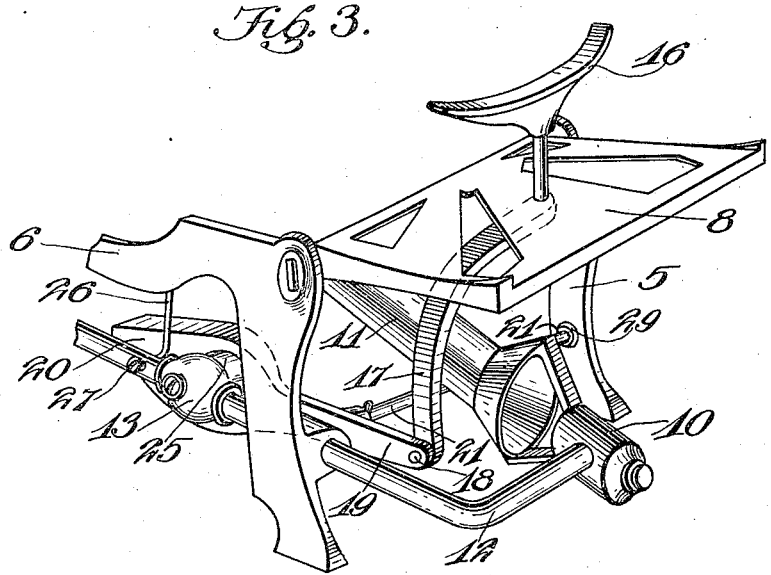
Fig. 4 is a perspective view of a fragment of the device showing the control device.

The valve 13 is controlled by the soldering iron or other tool to be heated. The tool is shown dotted in Fig. 3. A tool rest is provided, the same comprising a substantially T-shaped member 16 curved at the top to form a depressed seat for the tool, and having a laterally and downwardly directed shank 17. This shank is pivotally connected at its lower end, as shown at 18, to one end of a lever 19 having its other end enlarged to form a weight 20. The lever is fulcrumed intermediate its ends on a cross rod 21 carried by the stand. The enlarged portion of the lever has an opening 22, the edge of which, on one side, is cut with rack or gear teeth 23 meshing with gear teeth 24 on one side of the spindle 25 of the valve 13. It will therefore be seen that the flow of gas to the burner 10 is turned on or off when the lever 19 is rocked. The weight 20 normally holds the lever in position to close the valve, and when a tool is placed on the rest 16, the lever is swung to open the valve. Upon removing the tool the lever is swung back by the weight to close the valve.

A pilot burner tube 26 is connected to the supply pipe 12 back of the valve 13 so that the pilot light will continue to burn when the valve is closed. The size of the pilot flame may be regulated by a valve screw 27 threaded into the supply pipe. The pilot tube terminates close to the discharge end of the burner nozzle 11.

In order to prevent the flame from being blown out at the nozzle 11, or to back-fire, a cross bar 28 is fitted into the outer end thereof. This cross bar divides the flame issuing from the nozzle and holds it at the end thereof.

On the inner sides of the forward legs of the stand are recessed bosses 29 forming a bearing support for the cross rod 21. This does away with boring holes to receive the end of the rod, and as the two sides 5 and 6 of the stand are separate, the parts can be readily assembled.

The hood 14 rests squarely on the furnace 7, but it may be swung upward on its rear edge and tilted as shown dotted in Fig. 1 to permit a pot or ladle to be set over the flame without the need of lifting the hot hood off the furnace, and then replacing the same. The stop for the tilture of the hood comprises two curved tongues 30 projecting downward from the back end of the hood into elliptical and countersunk apertures 31 made in top rest projections 32 of the furnace. The hood rests in open position on account of being overbalanced beyond the vertical line through the apertures 31.

At 33 is shown an angle iron plate which is laid in the furnace 7 to deflect the flame from the burner upward when necessary or to form a rest for a smaller soldering iron.

The curved tool support 16 places the tool in the middle, while the valve operating gearing is at the side and supported by the legs of the stand, and hence no special middle support need be built up. As the teeth 24 are only on one side of the spindle 25, the smooth sides of the latter come in contact with the ends of the opening 22, limiting the extent of the swing of the lever 19. Thus, it will be seen that the means for limiting the swing of the lever are within the lever itself, the lever being free to swing only to the extent of the length of the opening 22.

I claim:—

1. The combination with a gas burner and a fuel supply valve therefor; of a tool rest having a curved top seat for the tool and a laterally and downwardly extending shank, a lever fulcrumed intermediate its ends and having one end connected to the shank, the other end of the lever being enlarged to form a weight, and said enlarged end having an opening provided on one side with rack teeth, and a spindle for operating the aforesaid valve, said spindle extending into the aforesaid opening and having teeth which are in mesh with the rack teeth.

2. The combination with a gas burner and the fuel supply valve therefor; of a tool rest, a lever fulcrumed intermediate its ends and having one end supporting the tool rest, the other end of the lever being enlarged to form a weight, and said enlarged end having an opening provided on one side with rack teeth, and a spindle for operating the aforesaid valve, said spindle extending into the aforesaid opening and having teeth on one side which are in mesh with the rack teeth.

3. The combination with a gas burner and a fuel supply valve therefor; of a tool rest, a lever fulcrumed intermediate its ends and having one end supporting the tool rest, the other end of the lever being enlarged to form a weight, and said enlarged end having an opening provided on one side with rack teeth, and a spindle for operating the aforesaid valve, said spindle extending through the opening and limiting the swing of the lever to the extent of the length of the opening, one side of the spindle having teeth which are in mesh with the rack teeth.

In testimony whereof I affix my signature.

WILLIAM T. WILSON.

Copies of this patent may be obtained for five cents each, by addressing the "Commissioner of Patents, Washington, D. C."